Dec. 14, 1965    A. BOSCHI    3,222,729
MOLDING AND VULCANIZING DEVICE
Filed Nov. 3, 1961    2 Sheets-Sheet 1
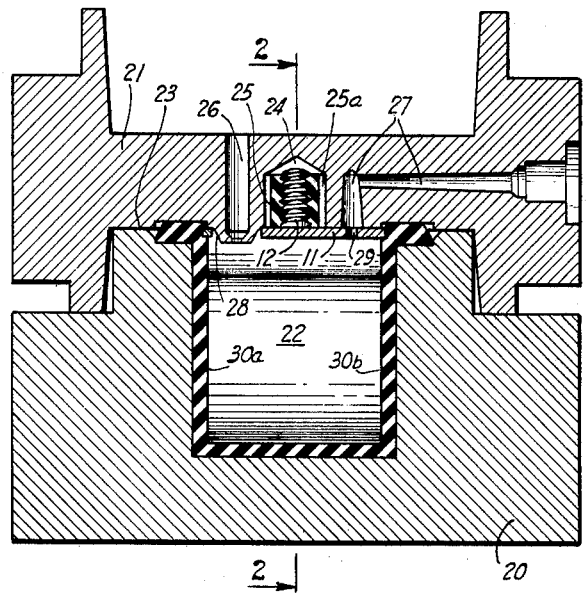
Fig. 1
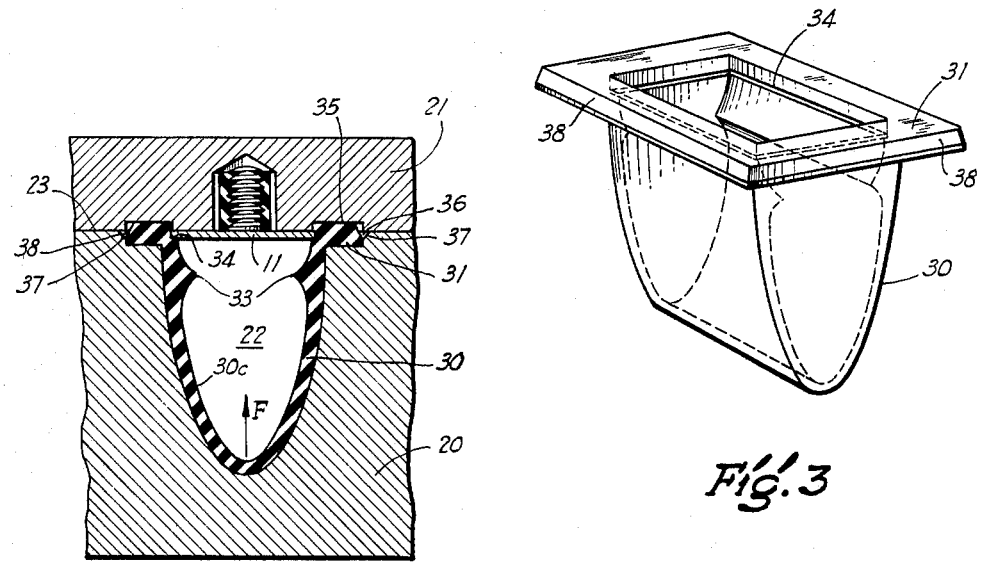
Fig. 2
Fig. 3
INVENTOR.
Antonio Boschi
BY
Stevens, Davis, Miller & Mosher
ATTORNEYS Dec. 14, 1965  A. BOSCHI  3,222,729
MOLDING AND VULCANIZING DEVICE
Filed Nov. 3, 1961  2 Sheets-Sheet 2

INVENTOR.
Antonio Boschi
BY
Stevens, Davis, Miller & Mosher
ATTORNEYS

3,222,729
MOLDING AND VULCANIZING DEVICE
Antonio Boschi, Milan, Italy, assignor to
Pirelli S.p.A., Milan, Italy
Filed Nov. 3, 1961, Ser. No. 149,983
Claims priority, application Italy, Nov. 18, 1960,
19,914/60
1 Claim. (Cl. 18—36)

The present invention relates to molding and vulcanizing devices comprising at least two elements made of metal or of other suitable rigid elements, which elements are suitably shaped to form a vulcanization cavity when they are placed together. The cavity will communicate with the atmosphere by means of one or more orifices which are employed for venting and/or injection purposes. More particularly, the present invention relates to a molding device of the above type which includes at least one insert of compact rubber, or similar material, having a first surface portion defining a part of the geometrical shape of the cavity and a second surface portion which is supported against deformation by at least one of the rigid elements of the mold, as will hereinafter more clearly appear. By "compact" is meant that the insert is devoid of any compressible material, such as gas.

Heretofore, molds having two or more rigid elements have been used to shape and vulcanize many different kinds of rubber articles. In certain instances, this operation can be performed in such a manner as to provide the articles with rigid (generally metallic) frames which are firmly fastened to the rubber body during the vulcanization. For example, it is possible, in molds of the same general type referred to herein to form an article, such as a shock absorber, having a pair of spaced and concentric cylindrical bushings connected together by an intermediate elastic element; in such an instance, the vulcanization cavity will be so shaped as to receive the two cylindrical bushings in a pre-determined concentric relation and to maintain them in this relation both during the injection of the rubber compound and during the vulcanization thereof. Other molds of this same general type can be used, for example, for the manufacture of rubber stop pads provided with a metal frame having a threaded stem which can be used for connecting the stop pad with any suitable structure with which the pad may be employed to advantage.

Generally speaking, the number of rigid elements constituting the mold will depend upon the geometrical configuration of the vulcanized article considered in view of the facility, and sometimes the possibility, of removing the vulcanized article from the mold. In the simplest cases, for example in connection with those articles having a tubular cylindrical shape, it is sufficient to provide a "containing" element and a "covering" element, these elements mating with each other along a plane interface perpendicular to the longitudinal axis of the article. In other and more complicated cases, it may be necessary to provide a mold having three or more separate rigid elements, especially where the article includes grooves or projections forming undercuts with respect to the direction of removal of the article from the mold. In still other cases, it is sometimes necessary to provide molds having three or more separable portions where the mold is designed to accommodate a metal frame which will be attached to the rubber article by vulcanization. In any event, it should be quite evident that these molds which include three or more separate rigid elements will be more complicated, more expensive and might well lead to process difficulties.

Heretofore the article removed from the mold generally had to be subjected to a trimming operation. The burrs present on the article were due to two main causes. The first is the presence of an interface between the mold elements along which they should mate in a tight manner; however, in many cases, the mold elements do not mate in the manner intended such that the interface constitutes a narrow opening or slit because of incomplete or inaccurate finishing of the surfaces of the mold elements or because of deformations occurring through usage or because of corrosive or erosive action along the surface.

Another cause of the burrs arises where metal frames are attached to the articles by vulcanization. In most cases these frames are manufactured within wide tolerances at least proportional to the structure with which the article is to be used; for example, in buses, trucks, railway coaches and the like, tolerances up to one mm. or above are quite common. Therefore, if the frame is actually smaller than the dimensions which are designed into the mold, the pressure within the mold during vulcanization will push the rubber compound into the space between the frame and the mold with a consequent formation of burrs. The same effect results even when the dimensions of the frames are substantially constant, closely approximating the nominal standard dimensions, because the seats in the mold which are adapted to receive the frames must necessarily be oversized by an amount commensurate with the maximum positive limits of the tolerance.

Needless to say, the trimming of these articles to remove the burrs involves machinery, motive power and labor which is expensive and burdensome.

Therefore, the present invention provides, in addition to the two rigid elements forming the vulcanization cavity, an insert of compact rubber, or the like, having a first surface portion which defines a part of the geometrical shape of the cavity and a second surface portion which is supported against deformation by at least one of the rigid elements of the mold. Since a typical feature of elastomers of the type employed in the insert consists in in the fact that the deformation under load takes place at a constant volume, the efficiency of this mold will be greatly evident to those skilled in the art. Therefore, if one were to partially fill the bottom of a cylindrical container with compact rubber (namely rubber without any compressible gas or similar material), and, if the filling is then subjected to a hydraulic or pneumatic pressure, the compact rubber filling will behave as an incompressible and indeformable element; it will be incompressible because the enclosed rubber cannot expand through the walls or bottom of the container; it will be indeformable because the hydraulic or pneumatic pressure will be evenly distributed over the free surface of the rubber such that there will be no localized pressure which might otherwise cause the rubber to flow towards a zone of lower pressure. It should be noted that the incompressibility and indeformability described above do not depend on the configuration of the free surface; for example, a cone projecting from said free surface and forming a portion thereof would retain its conical shape under the hydraulic or pneumatic pressure applied.

Therefore, it should be evident that the insert of compact rubber in a mold of the type described above is incompressible and indeformable even though the vulcanizable material develops an internal pressure during the vulcanization.

It might be noted that the internal pressure in the vulcanizable material is due to two factors; (a) the pneumatic pressure of gases generated during the vulcanization, and (b) the pressure of the vulcanizable material itself, which under vulcanization tends to expand and whose pressure is substantially similar to that usually defined as "hydraulic pressure." The inserts of compact rubber, in general, do not hinder the expansion of the gases, or, at least, must not necessarily be intended as a tightening means against such expansion. On the contrary, it is preferable that the gases and vapors are not hindered by the rubber inserts during their passage toward the atmosphere. The true action of the inserts takes place under the hydraulic pressure of the vulcanizable material which can be compared to an extremely thick and viscous liquid.

When the pressure of the liquid acts upon the unsupported surface portion of the insert, the opposite, or supported, surface portion of the insert is pressed, without any deformation, in tight engagement against the rigid element supporting it. This tight engagement can be insufficient to prevent the escaping of gases and vapors, but it is sufficient to prevent leaks (and, therefore, burrs) of the vulcanizable material. Therefore, if the rubber insert is partly supported against the two rigid elements constituting the mold and partly against the metal frame inserted into the mold, it will prevent the formation of burrs even if the interface between the elements of the mold has formed an actual opening or slit and even if the metal frame has certain dimensional defects.

In addition to the tightness which results from the mechanical action described above, a further tightness results from the thermal deformation or expansion of the insert which is greater than that of the metal surroundings. It is known that the pressure exerted by a vulcanizable compound against the mold is due chiefly to the thermal expansion of the compound during vulcanization. In the case of molds provided with rubber inserts in accordance with the present invention, the thermal expansion of the insert takes place simultaneously with that of the mold and the tightness is therefore insured during the whole molding and vulcanizing process.

The indeformability of the rubber insert in the mold is immediately compromised as soon as the mold is open for removal of the article, since the open mold permits breathing of both the rubber insert and the vulcanized article. At this point, it should be noted that, where it is desired to provide a finished article having projections or grooves, the rubber insert can still exist as a unitary member whereas prior art molds designed for the same purpose would have to include at least three separable members. During the vulcanization step, the insert behaves as a rigid member and therefore reproduces the desired groove or projection upon the article in the correct shape and position. After the opening of the mold, however, the insert becomes deformable, thus allowing the removal of the same in spite of the presence of the groove or projection. If necessary or desirable, the insert can be so arranged in the mold that it will be removed together with the vulcanized article; after removal, both the article and the insert can be easily deformed in such a manner as to detach one from the other. Therefore, the insert is available for a further vulcanizing operation.

Because of the greater thermal expansion of the insert relative to the metal parts, it is possible to divide the insert into two or more parts mating with one another where such a division of the insert would facilitate the removal thereof or of the article from the mold. The pressure resulting from the difference in thermal expansion between the metal and rubber causes the two parts of the divided insert to bear against one another during the entire vulcanization process.

It must be pointed out that the insert, described above as being made of "compact rubber," can also include internal re-enforcements, such as cloth, wire net, plate, etc., this re-enforcement being made of any suitable material provided that the incompressibility of the insert is not compromised and providing that its deformability is not affected where the deformability is required to permit separation of the insert from the article. Moreover, the term "rubber" used with reference to the insert should not be considered as a limitation upon the present invention because the insert can be made of other equivalent materials which would be well suited for the purposes of the present invention.

As regards rubber, it is not necessary to explain its characteristics, composition, hardness, etc., as the use of rubber envelopes during vulcanization is already known, for example, with regard to the curing bags employed in the manufacture of pneumatic tires. Also, it is unnecessary to describe and enumerate the various "detaching" varnishes and coatings which can be used to prevent the bonding of the article to the walls of the mold or the insert during vulcanization, since such "detaching" materials are well known in the art.

Therefore, it is a principal object of the present invention to provide a device of the character described above wherein there is included at least one insert of compact rubber or similar material, said insert having a first surface portion which defines a part of the geometrical configuration of the cavity and a second surface portion which is supported against deformation by at least one of the rigid elements of the device.

It is a further object of the present invention to provide a device of the character described above including the two rigid elements forming the mold, wherein the interface between the two rigid elements comprises a peripheral cavity extending about the vulcanization cavity and wherein the insert of compact rubber fills the peripheral cavity to form a tight packing.

It is a further object of the present invention to provide a device of the character described above wherein the rubber insert completely covers that portion of the vulcanization cavity which is defined by one of the mold elements.

It is a further object of the present invention to provide a device of the character described above wherein the insert is removable from the mold.

It is a further object of the present invention to provide a device of the character described above for the purpose of producing a composite article having a rubber or plastic portion and a rigid frame which is secured to the rubber portion by vulcanization wherein the rigid frame of the article assists in supporting the compact rubber insert against deformation during the vulcanization.

It is a further object of the present invention to provide a device of the character described above wherein the geometrical configuration of the cavity as formed by the corresponding surface portions of the compact rubber insert results in undercuts with respect to the direction of removal of the article from the mold.

It is a further object of the present invention to provide a device of the character described above wherein the compact rubber insert is made integral with one of the rigid mold elements, preferably by means of a joint.

It is a further object of the present invention to provide a device of the character described above wherein the compact rubber insert has a re-enforcement incorporated therein.

It is a further object of the present invention to provide a device of the character described above wherein the insert may be divided into two or more parts which mate with one another when they are placed in the vulcanization cavity.

It is a further object of the present invention to provide a device of the character described above wherein the vulcanization cavity is provided with one or more passages for injection and/or venting and wherein at least one of said passages opens into the vulcanization cavity through an orifice in the compact rubber insert.

It is a still further object of the present invention to provide a device of the character described above wherein one or more passages communicates with the vulcanization cavity through an orifice in the rigid frame of the article to be produced as described above.

Other and further objects and advantageous features of the present invention will hereinafter more fully appear in connection with a detailed description of the drawings in which:

FIGURE 1 is a vertical cross-sectional view through a vulcanization mold constructed in accordance with the present invention;

FIGURE 2 is a vertical cross-sectional view taken along section line 2—2 of FIGURE 1;

FIGURE 3 is a perspective view of the compact rubber insert employed in the mold shown in FIGURES 1 and 2;

Figure 5:
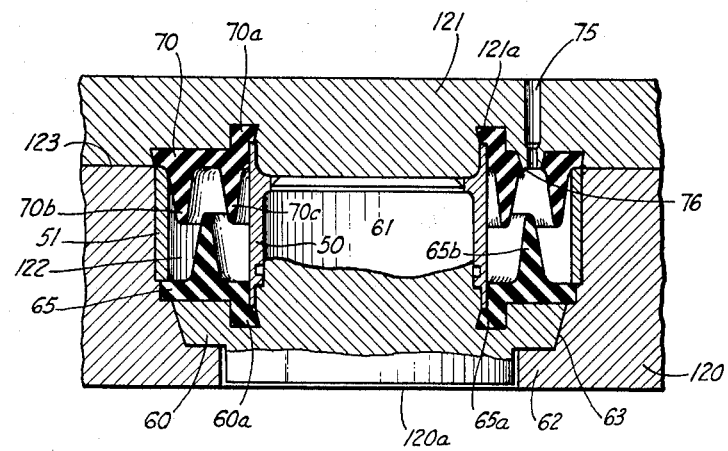
Figure 6:
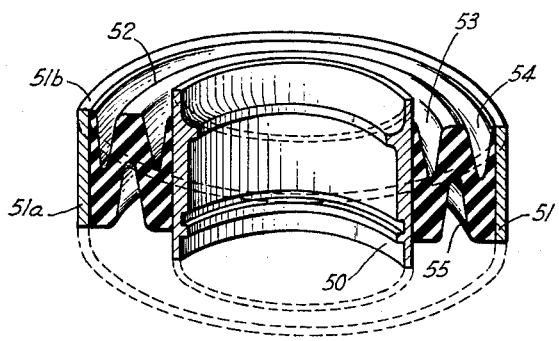

FIGURE 5 is a vertical (axial) cross-sectional view through a vulcanization mold constructed in accordance with the present invention wherein said mold is designed for the manufacture of a shock absorbing support including a pair of metallic tubular bushings concentrically arranged and interconnected by means of an annular elastic element; and FIGURE 6 is a view, partly in section and partly in perspective, of the shock absorbing support produced by the mold illustrated in FIGURE 5.

Figure 4:
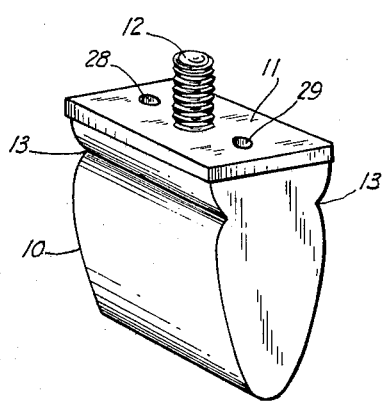
FIGURE 4 is a perspective view of the article produced from the mold shown in FIGURES 1 to 3.

Referring to the drawings in detail, and firstly to FIGURE 4, the article which is produced by the construction consists of a stop pad comprising a rubber body 10 connected to a metal frame 11. The rubber body and the metal frame are fastened together during the vulcanization. The metal frame 11 is provided with a threaded connecting stem 12 to permit the attachment of the stop pad to another structure (not shown) with which the pad may be suitably employed.

It will be noted that the profile of the body 10 is approximately parabolic with two inwardly directed angular grooves 13, 13 disposed on opposite sides of the body and shaped in the manner of inverted spires. Merely as a matter of interest, it might be pointed out that the grooves serve to smooth the action of the pad against shocks of small magnitude while, at the same time, insuring a strong action against shocks of greater magnitude. At any event, it will be apparent that the grooves 13 form undercuts with respect to the direction of removal of the article from the mold as will hereinafter more clearly appear.

The mold itself (see now FIGURES 1 and 2) includes a "containing" element 20 and a "covering" element 21, both made of steel, which enclose a shaping and vulcanizing cavity 22 and which mate with each other along an interface 23 which is disposed at the level of the upper end of the cavity 22. It should be understood that the container 20 and the lid or cover 21 are provided with means (not shown) for their fastening together in a press and with a heating means (not shown) which may be incorporated in the mold or which may be of a separate and auxiliary nature. Both the fastening means and the heating means are well known in this art such that their details need not be described further.

The lid 21 is provided with a central dead hole 24 opening into the cavity 22 for receiving the threaded stem 12 of the frame 11. The temporary fastening of the stem 12 in the hole 24 is insured by means of rubber sleeve 25 which is forced on the stem and which is provided with a plurality of longitudinal ribs 25a, the latter facilitating the forcement of the sleeve 25 in the hole 24. The lid also has a breather orifice 26 and a right-angled passageway 27, the latter being employed for the injection of the vulcanizable material into the cavity 22.

When the frame 11 is assembled in the lid, as described above, the passages 26 and 27 communicate with the cavity 22 through vents 28 and 29, respectively, the latter being provided in the frame 11 for this purpose.

The cavity 22 contains an insert 30 of compact rubber, such as butyl rubber or the like, formed in the shape of a pocket (see especially FIGURE 3). The insert is flared upwardly and is provided with a peripheral flange 31 which is integral with the pocket portion. The inner configuration of the pocket 30 is identical with the outer configuration of the rubber body 10 of the pad which is to be manufactured. The inner configuration of the insert 30 includes two flat surfaces 30a and 30b at the opposite ends of the insert and a curved surface 30c having a parabolic profile from which project two opposite spire-shaped ribs 33, 33 corresponding to the grooves 13, 13 of the pad 10. It should be noted that the grooves 13 and the ribs 33 form undercuts with respect to the direction of removal as indicated by the arrow F in FIGURE 2.

At the level of the flange 31, the inner surface of the pocket 30 forms a peripheral step 34. When the mold is in the closed position (as shown in FIGURES 1 and 2), the peripheral edge of the frame 11 fits against the step 34. The outer surface of the pocket 30 is smooth and devoid of undercuts so that the pocket can easily be inserted in the mold element 20. When the mold is assembled, this outer surface of the pocket is entirely supported against deformation by the element 20. The zone of the interface 23 directly adjacent to the cavity 22 is recessed so as to form a peripheral cavity 35 having a shape substantially complementary to that of the flange 31 of the insert 30. The above described interfitting arrangement between the mold elements 20 and 21, the metal frame 11 and the insert 30 provides sufficient support so as to prevent deformations which might otherwise be caused by the hydraulic pressure in the cavity 22 during the injection and vulcanization steps.

From a consideration of FIGURES 1 and 2, it can be noted that the flange 31 does not completely fill the cavity 35 such that a small peripheral channel 36 remains open. The channel 36 is formed by the outwardly sloping side edge 37 which extends around the entire lower periphery of the recess 35 and by the oppositely sloping edge 38 (see also FIGURE 3) of the rubber insert 30. Although the rubber insert has been described as being supported against deformation, it should be noted that the provision of the channel 36 in no way interferes with such support. For example, the radial (horizontal) dimensions of the flange 31 in comparison with its thickness and considered in light of its disposition between the rigid elements 20, 21 and 11 are such as to prevent any deformation of the flange under the action of the inner pressure during the vulcanization, even though the extreme outer edge of the flange is not in complete physical contact with the elements 20 and 21 of the mold. In practice the thickness of the flange exceeds slightly the height of the peripheral recess 35 so that, when the mold is closed, the flange is somewhat compressed. Therefore, when the mold is closed, the material of the flange 31 is partially pushed radially inwardly against the edge of the frame 11 so as to establish a pressure contact with the frame (even if the actual size of the latter is somewhat smaller than standard size), and is partially pushed radially outwardly, namely towards the zone 36 of the cavity 35.

Therefore, when the mold is closed, the unsupported portions 30a, 30b and 30c of the inner surface of the rubber insert and the free surface of the frame 11 define the desired shape of the cavity while the remaining surface portions of the rubber insert are supported against deformation by the rigid members 20, 21 and 11. Before closing the mold, the unsupported surfaces which form the vulcanization cavity are provided with a very thin film of "detaching" material. Then a vulcanizable compound is injected into the cavity 22 through the passages 27 and 29 until the cavity is completely filled. Vulcanization is carried out in a conventional manner during which time the metal frame 11 becomes firmly bonded to the rubber body 10. By virtue of the above described disposition of the rubber insert 30, considered particularly in light of Pascal's principle, the rubber insert behaves as a rigid member with respect to the inner pressure developed during vulcanization so that the shape of the cavity 22 does not vary. When the vulcanization is completed, the lid 21 is removed from the containing element 20 so that the rubber insert 30 again becomes deformable. Assuming that the insert has not been fastened to the mold element 20, the insert is removed together with the shaped article; by virtue of the deformability of the insert, the latter is readily separated from the article. The resulting pad 10 (see FIGURE 4) does not show any burrs and, moreover, the spire-shaped grooves 13 are obtained without resorting to the division of the mold element 20 into two separate parts, as would otherwise be the case in the absence of the compact rubber insert 30.

The embodiment of the invention shown in FIGURE 5 relates to the production of a shock absorbing support for rotatable members, such as shafts, this shock absorbing support being illustrated more particularly in FIGURE 6. The support comprises a pair of metallic cylindrical bushings 50 and 51 which are arranged concentrically with respect to each other and which are connected together by means of an elastic intermediate element constituted by an annular rubber block 52. The rubber block 52 has a W-shaped cross-section formed by a pair of concentric grooves 53 and 54 each having a V-shaped profile and opening onto one surface of the block 52 and by a single concentric groove 55 also having a V-shaped profile but opening onto the opposite surface of the block 52. The grooves 53, 54 and 55 are radially spaced with respect to each other, the diameter of the groove 55 being intermediate that of the grooves 53 and 54. The depth of the grooves 53, 54 and 55 is at least equal to one-half of the axial thickness of the annular block 52. The inner and outer cylindrical surfaces of the annular block 52 are fastened to the corresponding bushings 50 and 51 by vulcanization.

The mold illustrated in FIGURE 5 comprises a lower containing element 120 and a covering element or lid 121 mating with each other along a plane interface 123. The bottom of the containing element 120 includes a separate steel piece 120a having a circumferential collar 60 and an axial core 61. The axial core 61 has such a shape that the bushing 50 may be received thereon by simply fitting it over the core 61 from the top. The collar 60 rests against a flange 62 of the containing element 120. The containing element 120 is provided with a conical surface 63 immediately adjacent the flange 62 and the outer periphery of the collar 60 is also provided with a complementary conical surface so that the steel piece 120a is properly centered with respect to the containing element 120. The piece 120a with its collar 60 and core 61 will act as an expeller of the formed article and, therefore, will hereinafter be referred to as the "expeller."

At the base of the collar 60, the expeller 120a is provided with a groove or recess 60a having a dove-tailed profile. The groove 60a has received therein a collar 65a of an annular insert 65 of compact rubber or similar material. The collar 65a has a shape which is complementary to that of the groove 60a. The insert 65 extends over the bottom of the annular vulcanizing cavity 122, the latter being enclosed by the containing element 120, the expeller 120a and the lid 121. It should be pointed out also that the insert 65 covers the interface formed by the conical surface 63 and the flange 62. When the metal bushing 50 is fitted onto the core 61, as shown in FIGURE 5, the lower portion of the bushing forms an inner radial support for the rubber insert 65.

An annular rib 65b having a profile shaped as an inverted V, which shape is complementary to that of the groove 55 (see FIGURE 6) extends upwardly from the insert 65 into the cavity 122. The rib 65b, of course, is integral with the insert 65.

The lid 121 is provided with another annular insert 70 of compact rubber which extends radially across the top of the cavity 122 and which is provided with a collar 70a whose profile is dove-tailed in shape and which is received in a correspondingly shaped groove or recess 121a in the lid 121. The insert 70 is provided with two integral and concentric annular ribs 70b and 70c each having a V-shaped profile and which extend into the cavity 122 in positions corresponding to those of the grooves 53 and 54 (see FIGURE 6). From a consideration of FIGURE 5, it should be apparent that the upper end of the metal bushing 50 provides an inner radial support for the rubber insert 70.

The larger diameter of the annular cavity 122 is equal to the maximum allowable limit for the outer diameter of the outer metal bushing 51 such that this bushing can be readily fitted into the cavity 122 as shown in FIGURE 5.

The disposition described above with reference to FIGURE 5 results in a symmetry about the vertical central axis of the core 61, except for the presence of the breather and injection orifices in the lid 121. However, the number and position of these orifices is merely a matter of convenience. One of these orifices or passages is generally designated by the reference character 75, the inner end thereof extending through a frusto-conical projection 76 on the inner surface of the lid 121. The compact rubber insert 70 has an opening complementary to this projection 76 so that, in effect, the passage 75 opens into the cavity 122. Although only one such passage 75 is shown in the drawings, it should be understood that additional passages for breathing and/or injection may be provided as desired.

After both bushings 50 and 51 are inserted into the cavity 122, the mold can be closed. Since the inserts 65 and 70 are fastened to the mold elements 120 and 121, respectively, the free space in the vulcanization cavity 122 will then represent the desired configuration of the annular block 52. Certain of the surface portions of the inserts 65 and 70 will form part of the actual geometrical shape of the vulcanization cavity, while the remaining surface portions of these inserts are supported against deformation by the mold elements 120, 120a and 121 and by the bushings 50 and 51. The vulcanization pressure, acting against the inserts, leads to an improvement in the physical contact of the inserts against the surrounding rigid elements without modifying the configuration, the size, or the disposition of the surface portions of the inserts which take part in the geometrical definition of the cavity 122. In this manner, any penetration of the vulcanizable material along the interfaces between the elements bordering on the cavity 122 is avoided while, at the same time, the annular block 52 is shaped and vulcanized in the desired manner so as to produce the block 52 shown in FIGURE 6. The metal bushings 50 and 51 become firmly bonded to the annular rubber block 52 during the vulcanization process. If necessary, the annular ribs 65b, 70b and 70c can each contain a re-enforcement, for example, constituted by a cylindrical plate incorporated into the rib. If desired, such re-enforcement can also be extended to the flat annular portions of the two inserts, since the removal of the finished article does not require, in this case, a deformation of the inserts comparable with that necessary in the case of FIGURES 1 and 2.

Since the metallic bushings 50 and 51 are pressed against the inserts 65 and 70 when the mold is closed, it will not be significant if the end portions, for example, 51a and 51b of the bushing 51 are irregular or imperfect, since the pressure of the fit will prevent the formation of rubber burrs.

For the purpose of fastening the inserts to the corresponding elements of the mold, it is preferable to resort to couplings, such as dove-tailed joints, instead of bonding or vulcanizing these inserts to the mold elements so that the worn inserts can be readily replaced.

Whereas, the present invention has been described in particular relation to the drawings attached hereto, it should be understood that other and further modifications, apart from those shown or suggested herein, may be made within the spirit and scope of this invention.

What is claimed is:

A sectional mold for injection-molding and vulcanizing rubber articles comprising a rigid container member and a rigid cover member mating with each other along an interface to jointly define a part at least of an injection and vulcanization cavity in the mold, at least one of said members having a recess therein about the cavity at a location adjacent said interface; an insert of compact rubber filling said recess and also constituting a lining on one only of said members in an arrangement wherein a surface portion of said insert cooperates with an exposed surface portion on the other of said members to define a part at least of the geometrical configuration of said cavity corresponding to the configuration of the article to be molded in the mold and wherein the remaining surface portion of the insert is backed by adjacent portions of said members against deformation under hydraulic pressure in the cavity consequent to injection and vulcanization of a vulcanizable mix in the cavity; and a rigid frame adapted to form a part of the article to be vulcanized, said rigid frame serving to assist said other member in supporting said insert against deformation by abutting said exposed surface portion on said other member.

References Cited by the Examiner

UNITED STATES PATENTS

| | | | |
|---|---|---|---|
| 2,152,738 | 4/1939 | Jeffery. | |
| 2,337,036 | 12/1943 | Erdle | 18—34.1 XR |
| 2,337,998 | 12/1943 | Karoff. | |
| 2,524,737 | 10/1950 | Sawyer | 18—34 |
| 2,714,226 | 8/1955 | Axelrad | 18—47 XR |
| 2,762,395 | 9/1956 | Lamb. | |
| 2,771,850 | 11/1956 | Wheelon | 113—44 |
| 2,958,918 | 11/1960 | MacMillan. | |
| 2,971,237 | 2/1961 | Graham. | |
| 3,034,191 | 5/1962 | Schaefer et al. | |
| 3,083,408 | 4/1963 | Bichl | 25—122 XR |

WILLIAM J. STEPHENSON, *Primary Examiner.*

MICHAEL V. BRINDISI, *Examiner.*